Sept. 27, 1966   HIROTO KOBAYASHI ET AL   3,275,022
VALVE ASSEMBLY
Filed Jan. 4, 1963   5 Sheets-Sheet 3
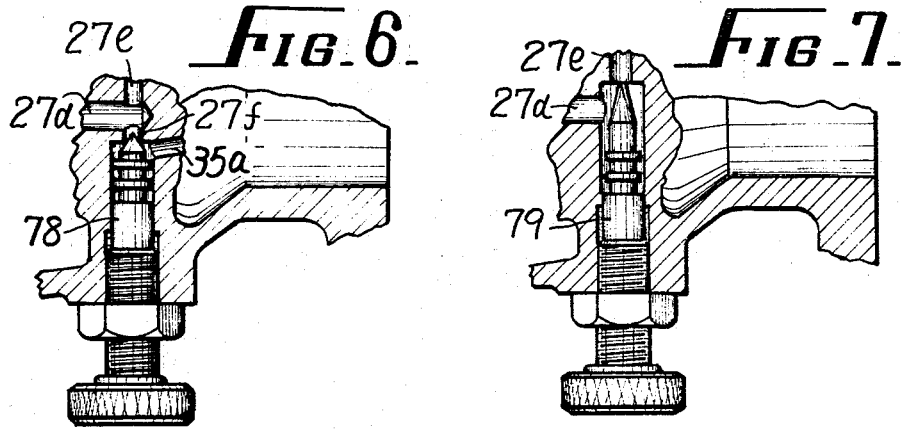
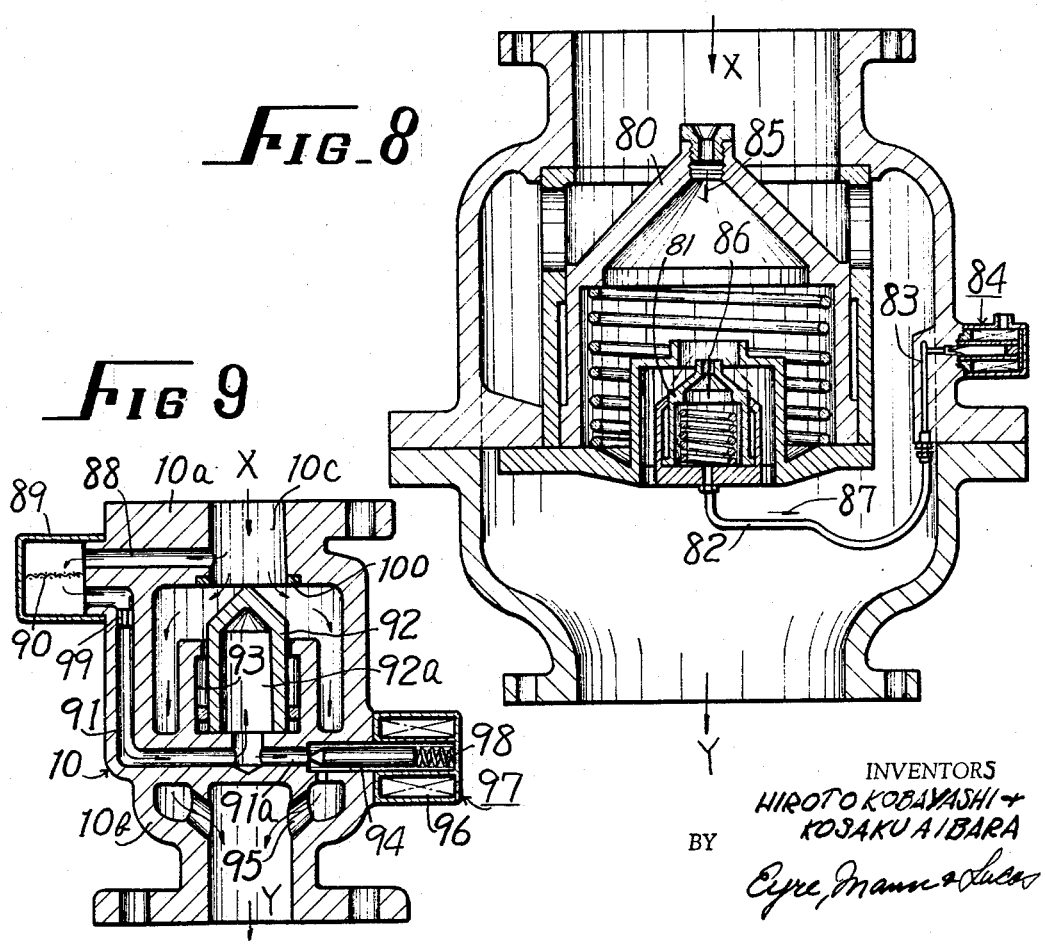
INVENTORS
HIROTO KOBAYASHI +
KOSAKU AIBARA
BY
Eyre, Mann & Lucas

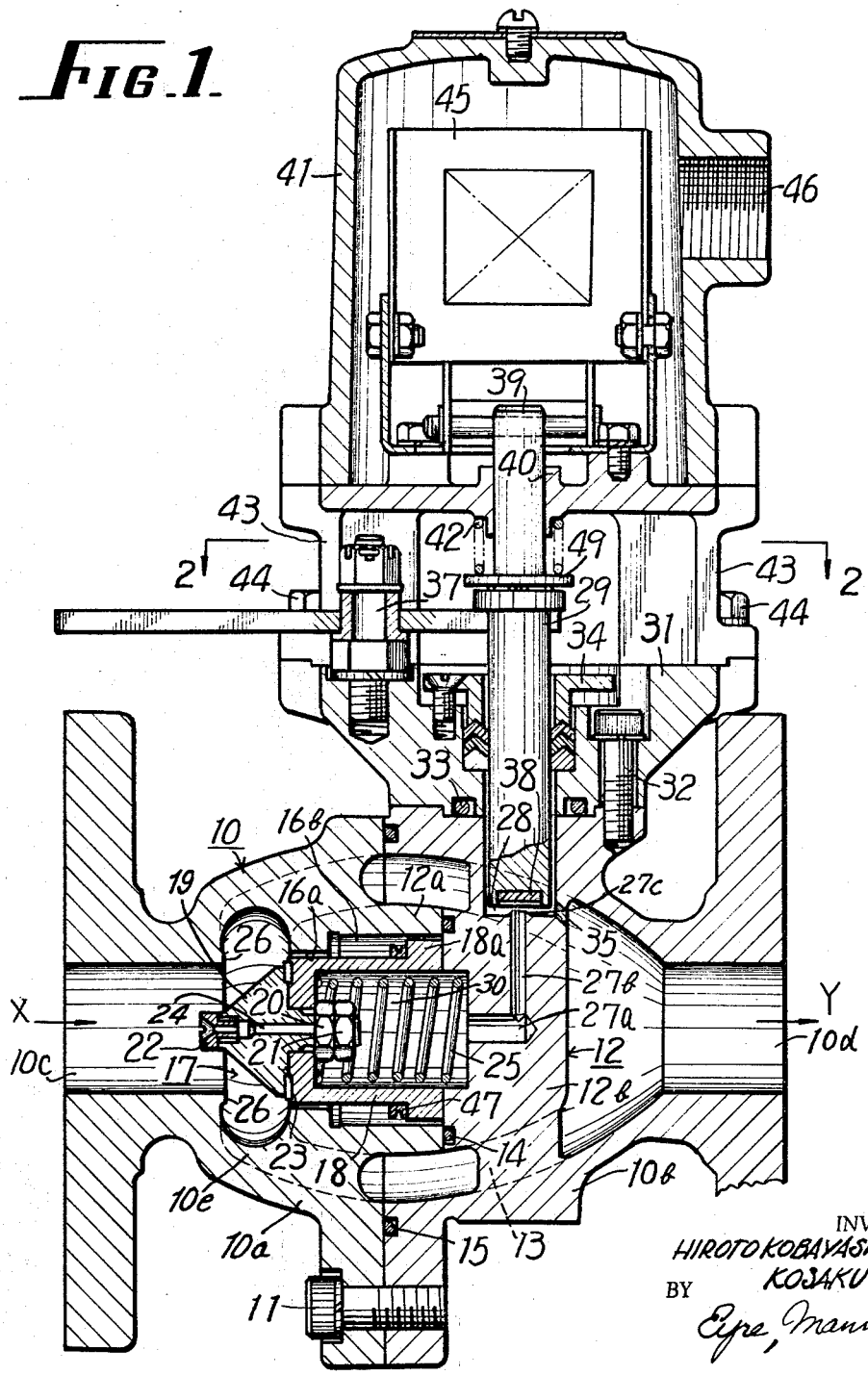

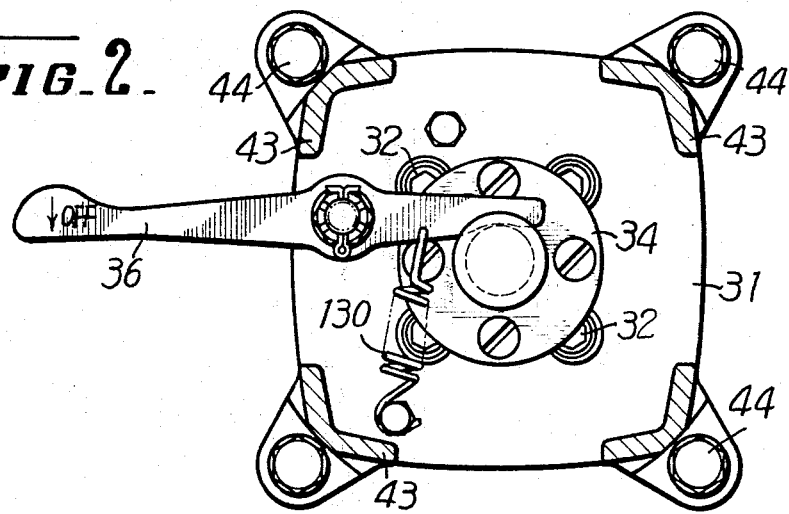
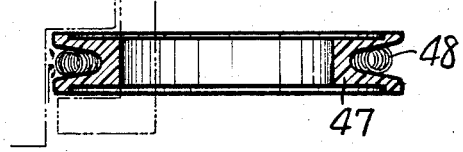
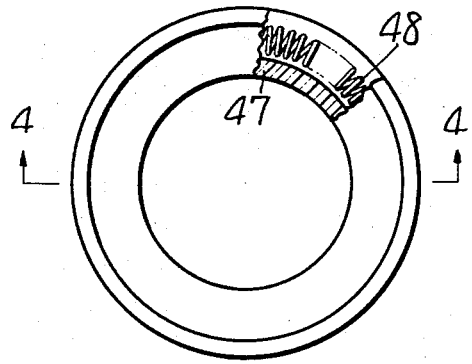
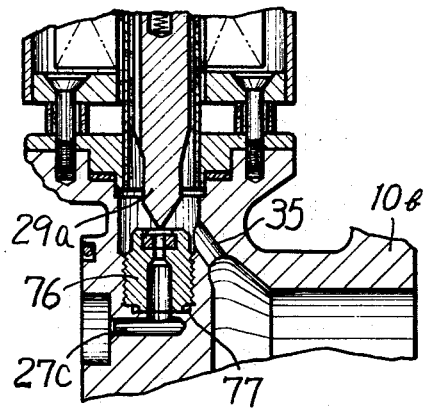

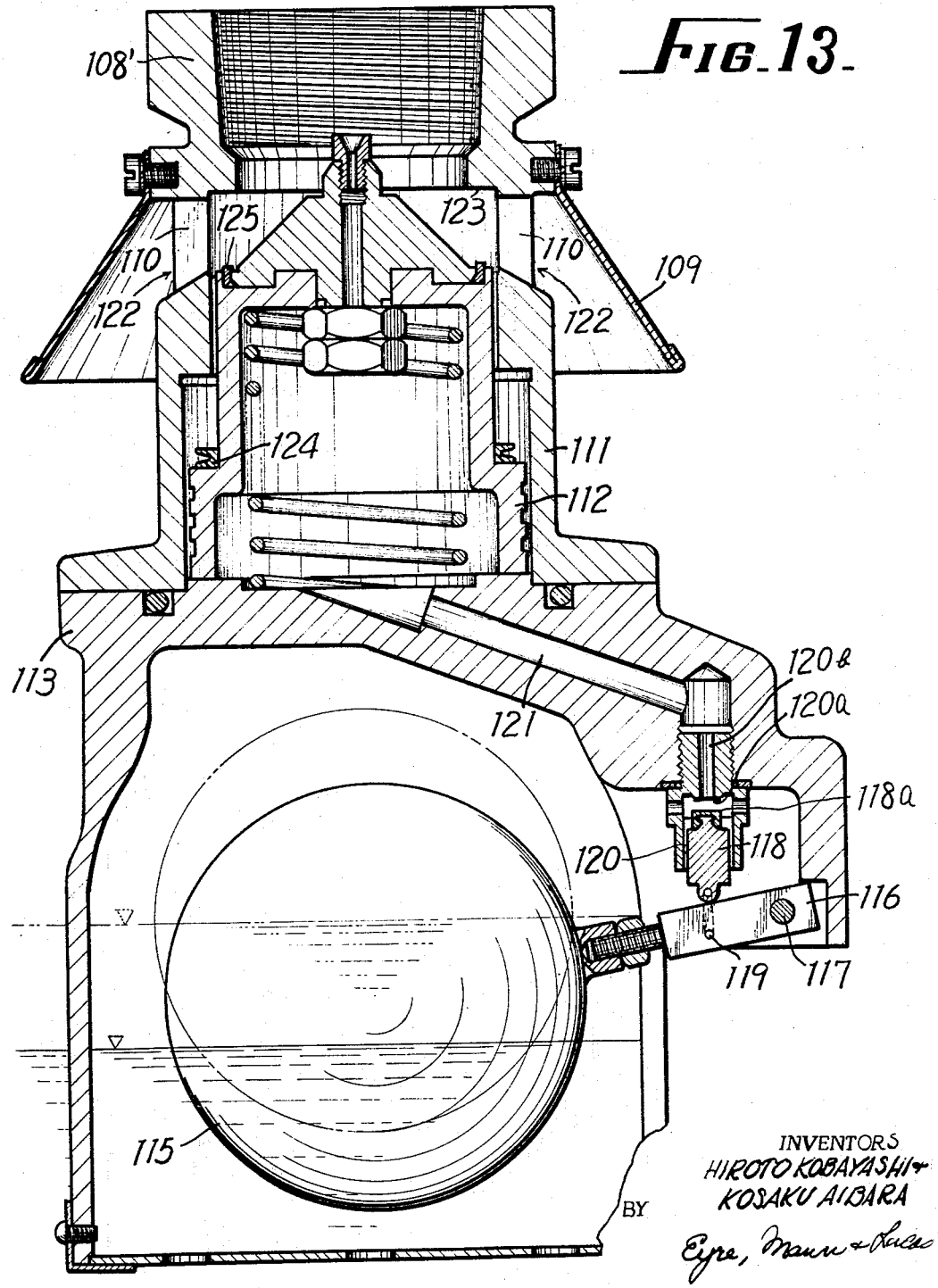

United States Patent Office 3,275,022
Patented Sept. 27, 1966

3,275,022
VALVE ASSEMBLY
Hiroto Kobayashi and Kosaku Aibara, Kawasaki, Japan, assignors to Kabushiki Kaisha Keihin Seiki Seisakusho, Kawasaki, Japan, a corporation of Japan
Filed Jan. 4, 1963, Ser. No. 249,417
2 Claims. (Cl. 137—221)

This invention relates broadly to valve assemblies and more specifically to pilot-operated fluid shutoff, flow control valves, wherein a valve piston is subjected to a pressure difference between the main upstream and a pilot stream branched off therefrom and the latter stream is controlled by a pilot valve. Such a conventional valve assembly is generally so constructed that the main flow is completely shutoff when the pilot valve is closed to cease the pilot stream. Flow control feature can be also obtained when the pilot valve is made in the form of a flow control valve. The back pressure acting upon the main valve piston exerted by the pilot fluid pressure is generally assisted by spring means generally in the form of a coiled spring.

According to the conventional technique, the piston is kept also in fluid tight relation with the cooperating cylinder by means of a plurality of sealing rings or by fabricating the piston precisely, such as by polishing the latter to the desired dimensions for preventing possible leakage between the piston and the cylinder. Such a fluid tight cooperation requires naturally a large amount of effort to be exerted upon the piston for closing the latter, and the pilot valve must be designed correspondingly larger. When the pilot valve is solenoid-controlled, the required electrical power will become large, which means that a correspondingly large size solenoid coil is required and larger over-all sizes of the valve assembly will result. If the pilot valve is operated by a float, in the case of the liquid level control valve, the size of the float must also be designed correspondingly large.

It is therefore an object of the present invention to provide a pilot-operated valve of which the valve piston is movable in its closing direction with a considerable reduced effort in comparison with conventional valves.

Another object is to provide an improved pilot-operated valve of which the valve piston and the cooperating cylinder may be fabricated in their preciseness more roughly than conventional.

In addition to the provision of a considerable play between the valve piston and the cooperating cylinder according to the invention, there is provided efficient and resilient sealing means for the main valve as well as the aforementioned leaking gap between the valve piston and the cylinder.

Another object of the present invention is therefore to provide an improved pilot-operated valve which assures smooth, bubble-tight and drip-proof closing thereof.

A further object is to provide an improved pilot-operated valve of the kind above referred to, which is rugged, and of simple construction, having few moving parts to insure long life and maintenance-free operation.

These and other objects of the invention will be more apparent to those skilled in the art from a consideration of the following detailed description when taken together with the accompanying drawings in which:

FIG. 1 represents a longitudinal section of a pilot-operated, solenoid-controlled shutoff valve embodying the principles of the invention;

FIG. 2 represents a horizontal section taken on a plane 2—2 in FIG. 1;

FIG. 3 is a front view, partially broken away, of a sealing ring adapted to seal off the considerable leakage gap between the main valve piston and the cooperating cylinder only when the piston has been brought into its closed position;

FIG. 4 is a sectional view of the sealing ring taken on a plane 4—4 in FIG. 3;

FIG. 5 is a sectional detail view showing a modification of pilot flow-shut-off valve adapted especially for treating high pressure fluid;

FIG. 6 is a sectional detail view of a manually operable pilot flow shut-off valve employable in the novel assembly;

FIG. 7 is a similar view to FIG. 6, showing a manually operable regulating valve provided in the pilot flow passage, when necessary;

FIG. 8 is a longitudinal section of a double piston type solenoid-operated valve assembly embodying the principles of the invention, adapted especially to reduce the valve operating power;

FIG. 9 is a similar view to FIG. 8, showing a modification of single piston type, solenoid-operated valve assembly according to the invention, wherein strainer means are provided for screening off entrained impurities from the pilot flow;

FIG. 13 is a vertical section of a float-controlled, pilot-operated liquid level control valve constructed as a preferred embodiment of the invention.

Figure 10:
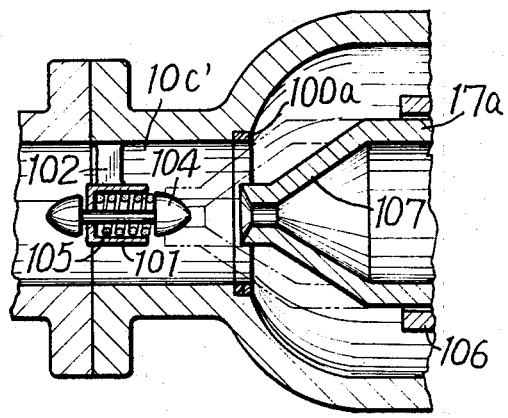
FIG. 10 is a longitudinal section through part of an improved valve assembly, wherein buffering means are provided in front of the head of the main valve piston so as to suppress possible liquid hammer when closing.

Now referring to FIGS. 1–2, a first embodiment of the invention will be described in detail hereinbelow:

10 denotes generally a two-piece valve body or casing comprising two separate casing elements 10a and 10b, which are detachably united together by means of a plurality of fixing bolts 11, of which only one is illustrated in FIG. 1. Centrally within the interior of the valve body assembly 10, there is provided a core piece 12 rigidly fixed with the casing wall by means of a plurality of radial ribs 13 cast integral therewith. The core piece 12 is in practice divided into two elements as at 12a and 12b. For insuring a fluid tight connection between the confronting surfaces of these elements, an O-ring 14 is provided as conventional.

In a similar way, a further O-ring 15 is provided for establishing a sufficient seal between the confronting surfaces of the casing elements 10a and 10b. The casing elements 10a and 10b are formed with inlet and outlet passages 10c and 10d, respectively, said passages being connected with each other by means of a ring passage 10e as indicated by dotted lines in FIG. 1. The core 12a is formed centrally with a stepped bore comprising a reduced portion 16a and an enlarged portion 16b, which bore is closed by the front wall surface of the other core element 12b. A valve member generally denoted by 17 passes loosely through the said reduced portion or opening 16a with a considerable diametrical play such as, for instance, about 0.2 mm. or larger for 50 mm. (2") valve, extending into the enlarged core chamber 16b. The diametrical gap will be reduced to about 0.06 mm. for 15.77 mm. (½") valve. For 10-in. valve the gap may be 0.4 mm. of more. As shown, the valve member is divided into three elements, that is, a hollow cylindrical element 18 having a radial flange 18a at its downstream end; a cone piece 19 detachably fixed with the last mentioned element 18 by means of nuts 20–21; and a nozzle piece 22 screwed in the cone at its apex. A resilient sealing ring 23 is provided between the mating surfaces of said members 18 and 19, and a narrow fluid passage 24 extends through nozzle- and cone pieces 22 and 19 and opens into the cylindrical innermost chamber 30. A coil spring 25 is contained within the chamber 30 so as to urge resiliently the thus formed valve member assembly towards a valve seat 26 formed on the downstream end of the inlet passage 10c. Valve seat 26 is adapted to cooperate with part of sealing ring 23, as will be more fully described hereinafter. An angular fluid outlet passage 27a–27b is drilled through the downstream core element 12b, and terminates into an enlarged vertical bore 28, in which a plunger 29 extends. The plunger is slidably guided in a mounting member or bonnet 31, which is detachably bolted to the uppermost flat surface of the downstream valve casing element 10b by means of a plurality of fixing bolts 32, only one of the latter is seen in FIG. 1. For sealing connection between the mating surfaces of casing element 10b and mounting member 31, O-ring 33 is provided, and in addition, for sealingly guiding the plunger, a gland assembly generally denoted by 34 is provided in the mounting member. The lower end of the enlarged bore 28 is open to the main fluid passage of the valve as at 35. A control lever 36 is pivotally mounted on the member 31 about a pivot 37, which is screwed therein, while the plunger is formed at its top end with an enlarged head and the free end of control lever is normally kept in engagement with the lower surface of the plunger head. In this position, the lower end of the plunger is kept separated by a predetermined distance from the bottom of bore 28, so that outlet passage 27 is in communication with the main valve passage 10c–e–d. In the bottom end of plunger 29, a resilient disc 38, preferably made from synthetic substance, such as, for instance, nylon, Teflon, Buna or the like, is embedded and adapted to cooperate with a valve seat 27c formed around the uppermost end of fluid passage 27b. Sealing means 23 may be made from a substance such as above listed.

The plunger 29 has an integral extension 39, which is slidably mounted in a boss 40 formed integral with the bottom wall of a coil cover casing 41 and urged by a coil spring 42 tensioned between a collar, on the one hand, which is formed on an intermediate portion of the plunger, and the bottom surface of the cover casing, on the other hand. The cover is provided with a plurality of depending legs 43, which are rigidly, yet detachably fixed on the upper surface of mounting member 31 by means of bolts 44. The cover casing contains therein a solenoid coil 45 shown only diagrammatically. Although not shown, the solenoid is conventionally electrically connected to a current source by means of suitable leads (not shown), which are inserted from outside through a socket 46, formed in the cover wall.

For the purpose which will become clear as the description proceeds, a sealing ring 47 is mounted around the periphery of the cylindrical element 18 and abuts upon the flange 18a.

This sealing ring, illustrated more fully in FIGS. 3–4, is preferably made of suitable synthetic substance, such as, for instance, nylon. Teflon, Buna or the like. This ring has a V peripheral groove as shown and is provided with a pressure member in the form of coiled spring 48, which may be dispensed with if desired.

The valve assembly described so far is constructed as an on-off valve, and operates as follows:

A fluid, such as pressurized air, steam, vapor, water, oil or the like, is conveyed from an inlet piping (not shown) rigidly bolted to the lefthand side flange (FIG. 1), to inlet passage 10c, as indicated by an arrow X. When the valve assembly is maintained in its open position as shown in FIG. 1, substantial part of the inlet fluid will flow through ring passage 10e to outlet passage 10d, while at the same time a small quantity of the fluid will flow as a pilot flow into the narrow passage 24, thence through chamber 30, passages 27a–27b, bore 28 and passage 35 into a space in front of outlet opening 10d, whereby the pilot flow combines with the main flow.

A leakage flow will occur naturally through a considerable large play or clearance between the cylinder member 18 and the reduced portion 16a of the core chamber. This flow will finally reach the passage 27, but this effect will act only to increase the quantity of the pilot flow above described, so that no adverse affect upon the proper functioning of the valve assembly results. On the contrary, the provision of the aforementioned relatively large play will contribute considerably to obtain the desirable smooth closing of the valve, as will be more fully described hereinafter.

When it is desired to close the valve, the control lever 36 is turned clockwise in FIG. 2 so as to separate the free end thereof from the plunger 29, thereby releasing the latter. Whereupon, the plunger moves down under the influence of coil spring 42, until disc 38 resiliently seats upon seat 27c so as to close the related pilot passage 27b. In this way, the pilot flow is completely shut-off, so that the fluid back pressure acting upon the main valve member assembly from inside thereof will become predominant to overcome the main positive fluid pressure acting upon the outer surface of the piston. In this case, spring 25 acts as an auxiliary means for closing the main valve. In general, this auxiliary means may be dispensed with, thus relying solely upon the fluid pressure as above described.

In this way, the main valve will advance and finally occupy its closing position, wherein the resilient ring 23 cooperates with the seat 26. In this position, the main flow is completely shut down. The valve constituents are so arranged and dimensioned that in the closing position of the valve, the resilient ring 47 will effectively seal the aforementioned considerable gap along the valve casing wall at 16a. The above-mentioned double sealing means comprising resilient rings 23 and 47 operates effectively to keep the main and leakage fluid streams completely shut off.

The above-mentioned embodiment is of the manual reset type. When manual pressure is released from control handle 36 occupying its "off" position, a returning spring 130 (FIG. 2) acts to rotate the handle clockwise in the same figure so as to bring the free end thereof into abutting engagement with the collar on plunger 29.

When the valve is to be reopened, a manual switch (not shown) is closed so as to energize the solenoid coil 45 for attracting the plunger, and thus the latter is elevated thereby until it occupies the original position shown in FIG. 1. The outlet passage 27a–27b is thus opened to the main flow passage as before. In this way, the pilot flow is initiated and thus the fluid pressure prevailing in the valve chamber 30 is caused to reduce, whereby the fluid valve opening pressure acting upon the valve cone 19 will become predominant so that the counter fluid pressure plus spring pressure are overcome, whereby the main valve piston is displaced in the opening direction, that is, righthandwards in FIG. 1. The main fluid flow is then established as before and discharged from the discharge opening 10d as indicated by an arrow Y. The operator then turns the control lever 36 clockwise in FIG. 2 to the position shown in the figure so as to engage with the plunger 29 underneath its collar. The pilot flow from inlet opening 10c through passage 24, chamber 30, passage 27, bore 28 and passage 35 to discharge opening 10d is thus continued. If necessary, spring 42 and solenoid 45 may be reversed in their action. More specifically, the solenoid may be designed and arranged for serving to close the pilot passage 35 with the coil spring 42 serving to return the plunger to its opening position.

If necessary, the aforementioned switch may be so arranged that it is controlled by the control lever 36. With such arrangement, one touch manipulation of lever 36 will produce the aforementioned valve opening or closing operation, as the case may be. It will be clear that with the embodiment described so far, wherein a considerable piston leakage clearance and an efficient double sealing mechanism are employed, the piston movement is carried out in a highly smooth manner so that the necessary pilot flow is amazingly small in its rate. With such an improved construction, the whole valve assembly can be made highly compact and the electrical energy for the control thereof will be small.

If necessary, the manual handle can be dispensed with and the valving operation may be controlled only by the solenoid coil, just as in conventional solenoid-operated valves.

Although the above embodiment its adapted to be used for relatively low fluid pressure, for instance 5–200 p.s.i., the invention is not limited thereto. With a slight modification of the aforementioned embodiment, any fluid having a higher pressure such as for instance 2000 p.s.i. can be equally treated.

In FIG. 5, such a modification is shown by way of example. A plunger 29a which serves for the same purpose as that denoted by 29 in the foregoing embodiment has a pointed lower end as shown and is adapted to cooperate with a detachable valve seat member 76 screwed in the end portion of a pilot flow passage 27c which corresponds to that denoted by 27b in the foregoing embodiment. For the prevention of possible leak at the screw connection, a resilient sealing ring 77 made of nylon or the like, or a suitable soft metal such as copper is provided. Other parts are substantially similar in their design and function to those used in the preceding embodiment and thus same reference numerals are attached as before.

In a further modification shown in FIG. 6, a manual control feature is added. In this case, a branch passage 27f separates from the junction point between pilot flow passage portions 27d and 27e, which are similar to those denoted by 27a and 27b, respectively, in FIG. 1, and is controlled by a manually adjustable regulating member 78. When opened, the branch passage will be in communication with the main flow passage through a communication passage 35a similar to 35. Although not shown, the terminal point of pilot flow passage 27e is controlled by a solenoid-operated plunger as before. With this modified arrangement, a positive opening or closing of the valve assembly can be assured even in the event of power failure. With a still further modification, wherein the passage 27e is permanently closed, although not shown, a sole manual control feature can be realized.

Although in the foregoing, shutoff valves have been described, the invention can be equally applied to flow regulating valves. In this case, a regulating member 79 (see FIG. 7) is so designed that it controls the pilot flow at the junction point between pilot passage portions 27d and 27e.

When, in this case, the passage portion 27e is designed so as to directly communicate with the main fluid passage, although not shown, a sole fluid regulating valve can be realized, instead of the combined stop and regulating valve.

With the foregoing embodiments of the invention, the valve operating effort can be reduced to about 1:100 in comparison with conventional direct-lift valves. This ratio can be still further minimized when a further improved embodiment shown in FIG. 8 is employed.

In this case, a main piston assembly 80 cooperates with a daughter piston assembly 81; the inside chamber of the latter is fluid connected by means of a tubing 82 to a passage 83, which is controlled by a solenoid operated valve assembly generally denoted by 84. Although not shown, passage 83 is connected to the main flow passage at its downstream area generally denoted by an arrow Y. A plurality of small arrows 85, 86 and 87 indicate the pilot flow, so that the correct function can be easily understood from the description set forth so far. It should be noted however the floating piston arrangement and the double sealing feature are employed also in the present embodiment, but these outstanding constructional features are not illustrated in FIG. 8, for avoiding crowding and confusion in the drawing.

The reason why the V-grooved sealing ring 47 is employed in the foregoing embodiments is that when the valve piston is brought to its closed position, the ring is flattened mechanically under the influence of the valve closing pressure so that it fills resiliently up to the gap between the piston and the cylinder so as to effectively seal off the floating gap around the piston. If a small quantity of fluid leakage should occur, the leakage will enter into the peripheral ring space of the ring and considerably contribute to an increase in the sealing effect as indicated by small arrows in FIG. 4.

If the treating fluid should contain considerable quantities of impurities such as sand and the like, clogging may be encountered especially at the nozzle passage 24 in FIG. 1.

For avoiding such difficulties, screening or strainer means are provided in a further embodiment shown in FIG. 9. The valve assembly of FIG. 9 is designed to be of the vertical type, instead of horizontal type valve assemblies described hereinbefore. Same reference numerals are employed for similar constituent parts as in the foregoing for easy comparison.

In this case, pilot fluid flows from the upper or inlet opening 10c through a duct 88 into a strainer chamber 89, said duct passes laterally through the wall of the upper valve body element 10a, the chamber 89 being attached thereto although the fixing means are not shown for simplicity. The pilot flow is screened off the containing impurities by passing through a fine mesh screen 90 mounted in the chamber and the clean fluid discharges therefrom into a passage duct 91 provided in the valve body assembly 10a–10b and communicates with the interior space 92a of a hollow piston 92, which is slidably mounted in an upwardly open cylinder 93 made integral with the lower valve body element 10b. In this embodiment, there is no nozzle passage 24 and thus the piston crown is completely closed. An extension duct 91a of the guide duct 91 is connected through bore 94 and connecting passage 95 to the downstream zone of the main fluid passage generally denoted by arrows X and Y as before. A plunger is slidably mounted in the lateral bore 94 and urged inwardly by a coil spring 98 to close the opening at the inner end of the bore. The plunger is controlled electromagnetically by a solenoid unit generally denoted by 97. The arrangement is such that by energizing the solenoid the plunger is shifted to the right in the figure to a lesser or larger degree, thus the whole valve assembly acts as a stop and regulator valve. The control of the energizing current may be carried out by means of a suitable means such as a rheostat, although not shown. In order to avoid difficulties in providing a narrow pilot flow passage within the wall of the valve body, there is provided a flow reducing member as at 99 in the relatively wide passage 91. In the present embodiment, there is no spring within the piston chamber 92a, so that the closing force is exerted upon the piston 92 exclusively hydraulically. If desired, however, a coil spring as denoted by 25 in FIG. 1 may be provided. Although the piston 92 is illustrated as if it were of one piece for simplification of the drawing, it is in practice constituted by at least two elements such as the cylindrical element 18 and the cone element 19 in FIG. 1. Sealing means to cooperate with a main valve seat 100 is also provided although not shown. Alternatively, the valve seat per se may be of the resilient nature, as shown.

For a large capacity valve, it is preferable to buffer the closing movement of the piston assembly. In still further improved embodiments shown in FIGS. 10 and 11, respectively, such buffer means are provided.

In FIG. 10, a stationary sleeve 101 is fixedly mounted by a rib 102 extending from the inlet opening 10c' of the valve body in front of the main valve seat 100a, which is preferably made of a resilient plastic substance. A double headed buffer member 104 is resiliently supported through the intermediary of a coil spring 105 by the sleeve 101. When the piston assembly 17a advances in the aforementioned way in the closing direction, the pilot flow through the nozzle opening formed in the front cone end of the piston will be gradually and finally ceased upon the engagement between said member 104 and piston 100a as denoted by dashed lines in FIG. 10. In practice, a small side opening 107 is formed through the cone wall of the piston so that a small pilot fluid current through the interior thereof will be established.

In a modification shown in FIG. 11, the double head member described in connection with FIG. 10 has been replaced by an elongated flow control pin 108 fixedly mounted in sleeve 101. It will be understood that as the piston advances, the pilot flow through the nozzle opening of the piston will be gradually reduced so as to provide an effective action thereupon. In this way, a disadvantageous liquid hammer effect may be practically overcome.

Figure 11:
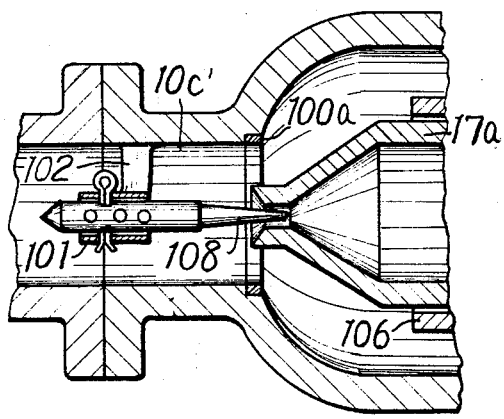
FIG. 11 is a similar view to FIG. 10, showing especially a pin type control means cooperating with the nozzle opening in the main valve piston so as to buffer possible liquid hammer from taking place.
Figure 12:
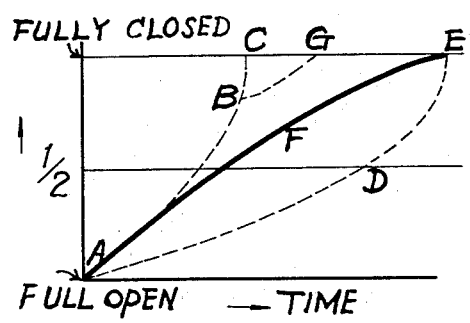
FIG. 12 is a diagram showing buffering effects obtainable with use of the aforementioned buffering means in FIGS. 10 and 11, respectively.

Effective buffering effect provided by the above explained arrangements, FIGS. 10 and 11, can be clearly seen from a diagram shown in FIG. 12. Dotted line A–B–C represents a closing characteristic of the valve shown in FIG. 1. By the provision of the buffering means described above in connection with FIG. 10, the closing characteristic can be modified and improved as shown by a curve A–B–G, which means that a sudden closing effect has been amazingly buffered. A similar valve to that shown in FIG. 1, having a large fluid capacity similar to a conventional 5" value, showed a closing characteristic curve A–D–E. By the provision of the needle type buffer described above in connection with FIG. 11, the curve was modified to line A–F–E, which represents again a remarkable improvement for avoiding a possible liquid hammer.

Figure 13A:
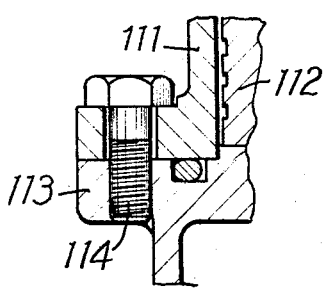
FIG. 13A is a sectional detail view illustrative of the bolted connection between the valve cylinder and the float housing shown in FIG. 13.

In FIG. 13 numeral 108 represents a socket which is hydraulically connected to a suitable liquid supply source, not shown. Socket 108 is fitted with a frustoconical buffer 109 bolted to the lower peripheral surface thereof and rigidly supported by means of a plurality of legs 110 on the top surface of a cylinder 111 which contains slidably therein a main valve piston assembly 112. This cylinder and piston assembly is similar in design and function to the corresponding parts described hereinbefore in connection with FIG. 1, so far as the pilot flow is concerned. The cylinder is closed at its lower end by means of a float housing 113, which is bolted to the cylinder by means of a plurality of fixing bolts 114, only one of the latter being shown in FIG. 13A. Housing 113 contains a float 115, which is provided fixedly with a stem 116 pivotally mounted in the housing as at 117. A small pilot valve 118 is hinged at 119 to the stem, on the one hand, and slidably received in a cylinder 120 screwed in the upper wall of said housing at the end of a pilot flow passage 121 bored through the said upper wall and communicating with the interior chamber of the main valve piston assembly. Small piston 118 is covered at its top end with a resilient cover 118a which is adapted to cooperate with a valve seat 120a on cylinder 120 having a longitudinal bore 120b kept in fluid communication with the said pilot passage. In this embodiment also, the aforementioned considerable piston gap as well as the double sealing means are provided.

In the illustrated position of this embodiment, the valve assembly is in its open condition so that the liquid flows in the socket and passes through lateral openings (not shown) down to the liquid level surface. When the liquid level gradually elevates and reaches the upper level shown by the dashed line, the float is naturally moved upwards and thus the arm 116 is caused to pivot about pin 117, whereby small piston 118 slides upwardly to close the pilot valve seat. Upon this operation, the pilot fluid flow flowing through the passage 121 is stopped, so that the hydraulic pressure prevailing within the piston chamber will be increased, whereby the main piston 112 is caused to move upwardly until it is brought into tight engagement with the cooperating valve seat 123. By this operation, the main fluid flow is completely interrupted as in the foregoing embodiments. The necessary double sealing effect can be assured by the provision of resilient means 124–5.

Without further analysis, the foregoing will so fully reveal the gist of the present invention that others can by applying current knowledge readily adapt it for various applications. All such applications which include features that, from the standpoint of the prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a pilot-operated valve assembly, the improvement comprising a valve body having a fluid inlet passage and a fluid discharge passage, a hollow piston slidably mounted in said body with a sufficient gap therebetween so as to cause said piston to assume a floating condition when fluid flows through said gap, said piston comprising a hollow cylindrical element having an enlarged flange portion and a cone piece detachably fixed thereto, a pilot fluid passage extending through said cone piece, and said valve body and providing a flow path from said fluid inlet passage, through said hollow cylindrical element to said fluid discharge passage, a solenoid operated plunger for opening and closing the pilot flow passage at the downstream end thereof, a first sealing ring mounted on said hollow cylindrical element and abutting said enlarged flange portion, a second sealing ring mounted between said cone piece and said hollow cylindrical element so that when the valve assembly is in a closed position said first sealing ring will prevent fluid flow through said gap between said valve body and said hollow piston and said second sealing ring will prevent fluid flow between said cone piece and said inlet passage.

2. In a pilot operated valve assembly, the improvement comprising a valve body having a fluid inlet passage and a fluid discharge passage, a hollow piston slidably mounted in said body with a sufficient gap therebetween so as to cause said piston to assume a floating condition when fluid flows from the inlet passage through said gap, said piston comprising a hollow cylindrical element having an enlarged flange portion and a cone piece at the upstream end thereof and detachably fixed thereto, a pilot fluid passage extending through said cone piece into the interior of said cylindrical element and through passages in said valve body to said fluid discharge passage, means for opening and closing the pilot flow passage at the downstream end thereof, a first sealing ring mounted on said hollow cylindrical element and abutting said enlarged flange portion, a second sealing ring mounted between said cone piece and said hollow cylindrical element so that when the valve assembly is in a closed position said first sealing ring will prevent fluid flow through said gap between said valve body and said hollow piston and said second sealing ring will prevent fluid flow between said cone piece and said inlet passage, said gap providing for flow of fluid from the inlet passage into the pilot fluid passage when the valve assembly is in open position.

References Cited by the Examiner
UNITED STATES PATENTS

| | | | |
|---|---|---|---|
| 398,841 | 3/1889 | Mayer | 251—33 X |
| 926,389 | 6/1909 | Collin | 251—32 X |
| 956,158 | 4/1910 | Pasman | 251—43 |
| 1,339,114 | 5/1920 | Larner | 137—219 |
| 1,917,000 | 7/1933 | Tyden | 251—357 X |
| 1,990,557 | 2/1935 | Melott | 251—357 |
| 2,251,441 | 8/1941 | Dillman | 251—30 X |
| 2,378,404 | 6/1945 | Grant | 251—32 X |
| 2,552,892 | 5/1951 | Garrett | 137—491 X |
| 2,664,916 | 1/1954 | Conley | 251—26 |
| 2,758,811 | 8/1956 | Peterson | 251—29 |
| 2,855,949 | 10/1958 | Sterner | 251—43 X |
| 2,882,922 | 4/1959 | Schindel | 251—43 X |

M. CARY NELSON, *Primary Examiner.*

A. JAFFE, E. FEIN, *Assistant Examiner.*